(12) United States Patent
Mouhebaty

(10) Patent No.: US 6,818,122 B2
(45) Date of Patent: Nov. 16, 2004

(54) DUAL STAGE FILTER ELEMENT BYPASS VALVE

(75) Inventor: Bijan Mouhebaty, Westlake Village, CA (US)

(73) Assignee: PTI Technologies, Inc., Oxnard, CA (US)

( * ) Notice: Subject to any disclaimer, the term of this patent is extended or adjusted under 35 U.S.C. 154(b) by 0 days.

(21) Appl. No.: 10/226,692

(22) Filed: Aug. 23, 2002

(65) Prior Publication Data

US 2004/0035769 A1 Feb. 26, 2004

(51) Int. Cl.[7] .............................................. B01D 27/10
(52) U.S. Cl. .................... 210/132; 210/338; 137/512.2; 137/545
(58) Field of Search ................................. 210/130, 132, 210/342, 340, 430, 487, 315, 338; 137/545, 512, 512.2, 512.4

(56) References Cited

U.S. PATENT DOCUMENTS

| | | | |
|---|---|---|---|
| 3,268,077 A | * | 8/1966 | Ball .......................... 210/131 |
| 3,283,902 A | * | 11/1966 | Farris et al. ................... 210/90 |
| 3,297,162 A | * | 1/1967 | Mouwen ...................... 210/132 |
| 3,390,774 A | * | 7/1968 | Neely .......................... 210/132 |
| 4,038,189 A | * | 7/1977 | Dison et al. .................. 210/90 |
| 4,783,271 A | * | 11/1988 | Silverwater ................. 210/742 |
| 4,885,082 A | * | 12/1989 | Cantoni ....................... 210/90 |
| 5,895,568 A | * | 4/1999 | Koltunov ..................... 210/130 |
| 6,117,312 A | * | 9/2000 | Mees et al. .................. 210/130 |
| 6,165,355 A | * | 12/2000 | Coulonvaux et al. ........ 210/131 |

* cited by examiner

Primary Examiner—Terry K. Cecil
(74) Attorney, Agent, or Firm—Pillsbury Winthrop LLP

(57) ABSTRACT

A replaceable cartridge type dual stage bypass valve is used in dual filter multi-media filtration assemblies. The cartridge may be selected and easily replaced to meet the various combinations and requirements of the dual filter elements (primary and secondary). The individual bypass valves that form the dual stage bypass valve may each be responsive to a predetermined increase of pressure due to a clogged filter condition. The individual bypass valves may use replaceable coil springs. The spring force of the coil spring is determined by the pressure differential to be resisted, i.e., the resistance to be offered by the spring action of the spring, and the flow capacity at a given pressure differential.

16 Claims, 4 Drawing Sheets

DUAL STAGE FILTER ELEMENT BYPASS VALVE

BACKGROUND OF THE INVENTION

1. Field of the Invention

The present invention generally relates to fluid filtration. More particularly, the present invention relates to a cartridge type dual stage filter element bypass valve.

2. Discussion of the Related Art

In order to remove contaminants from a flowing gas or liquid, the contaminated medium is often passed through a filter element in a filter. Filters are commonly used in the lubrication systems of standard internal combustion engines, e.g., automotive engines, truck or heavy equipment engines, and stationary power sources, e.g., computer numerical control (CNC) machines, injection molds, die cast machines, compressors etc.

Engine oil lubrication systems, which are typical of many fluid systems, frequently include a filter assembly which has a filter formed from a porous filter medium for removing damaging particles from the lubricating oil utilized in the system. Mechanical wear within the engine, the outside environment, and contaminants accidentally introduced during normal servicing provide a source of large particles which may plug lubricating nozzles or severely damage parts and create excessive wear on any surfaces relying on a thin film of the lubricating oil for protection.

Filtration systems used in these applications generally include a cylindrical housing into which a cylindrical filter is placed to remove particulate materials from fluids such as oil. Two types of filter assemblies have commonly been used in lubrication system applications, filter assemblies with removable filter elements and disposable filter assemblies. In a commonly used "spin-on" disposable filter assembly, the filter element is sealed in a metal can with a metal core located in the center of the element to provide a support structure. In such systems, to replace a clogged or dirty filter element, it is necessary to replace and dispose of the entire filter assembly.

In many filtration applications, the filter element must be changed periodically. For instance, in automotive applications the oil filter is typically changed every few thousand miles or every few months. There are a limited number of reusable oil filter types available or in use, but in most high quality lubrication systems, spin-on disposable filter assemblies are used, and these can create a disposal problem and are treated as hazardous material.

When filters were first introduced for use in lubrication systems, it was common to utilize cartridge type filter elements that fit into a removable housing. When the filter element needed replacement, the housing was removed from the oil filter mount on the engine, the cartridge was removed from the housing, the housing was cleaned, a new cartridge was installed, and the housing with the new cartridge was then replaced on the engine. Cartridge filters of that type usually included a cellulose filter membrane, exterior metal support, and a supporting center tube typically made of metal mesh or expanded metal. The metal supports, i.e., the center tube or outer wrap, were needed to prevent the filter from being crushed by the pressure generated in the lubricant being filtered. Differential pressures in an automotive lubricating system can rise substantially at engine start-up, and particularly during malfunctions, such as a plugged filter malfunction (due, for example, to water or excess engine wear metals in the oil), and can reach 200 pounds per square inch (psi) or more.

Lubrication systems typically rely upon a pump to force the oil through the filter and then circulate the filtered oil to the moving parts of the engine for lubrication. Oil is forced through the filter by limited pressure developed on the upstream side of the filter by the oil pump. The pressure required to force oil to pass through the filter at a given rate will be greater for more viscous or thick oils or for filters formed from finer pored filter media, i.e., porous filter media having smaller average or mean pore diameters.

It has been recognized that it is necessary in many instances to provide for a continuous flow of a fluid that passes through a filtering device, even after the filtering device has become clogged through extensive use thereof. One method for doing so utilizes a bypass valve. The function of a bypass valve is to respond to a pressure differential buildup caused, for example, by a plugged filter, and bypass oil around the filter. In effect, the bypass valve limits pressures in the system, but at the cost of passing unfiltered oil to the equipment.

To prevent unfiltered oil from passing to the equipment, a bypass valve may be used in combination with a second filter element. Examples of such use of multiple fluid filter elements in prior filtering systems are illustrated in U.S. Pat. No. 4,783,271 to Silverwater; U.S. Pat. No. 3,283,902 to Farris et al; U.S. Pat. No. 4,038,189 to Dison et al; and U.S. Pat. No. 4,885,082 to Cantoni. All of the prior filter devices illustrated in the aforesaid patents include dual filter systems that are designed to permit flow of the fluid medium to be filtered to continue even though the primary filter may have become obstructed in the use thereof. These prior systems, particularly as illustrated in the Silverwater and Farris et al patents, included concentrically located filters that are disposed in a cylindrical housing, and also include a relief or bypass valve construction that is responsive to back pressure caused by obstruction of the primary filter. However, the prior systems are somewhat complex and unreliable in use. Further, these prior known devices include a number of elements that have to be precisely machined and interfitted which renders the filter assemblies uneconomical in use.

For example, the Silverwater patent discloses a filter assembly which removes particles from a fluid and which comprises two filters, a first structure for directing the fluid first through one filter and then through the other, and a second structure for bypassing both filters. The Silverwater filter provides for a filtered flow through the second filter element whenever the primary element is clogged or so obstructed that the flow-through results in a pressure differential across that element above a predetermined minimum. A second by-pass is provided for the secondary filter element, so that when this element becomes clogged, or so obstructed that the flow-through results in a pressure differential across that element above a predetermined minimum, then all flow through the filter by-passes both the primary and secondary filter elements.

To accomplish the above, the Silverwater filter uses two separate bypass valves. A pressure-sensitive annular spring disc valve is positioned in the inlet passage so as, under normal conditions, to close off a line leading to the secondary filter element. Therefore, all flow must pass through an orifice into the primary filter element. At a predetermined pressure differential on the disc face, the minimum value of which is determined by the flow requirements of the system, the disc valve is actuated in a manner to open the passage between the inlet and secondary filter element. The dimensioning of the orifice is matched with the spring bias force of the disc and the dimensioning of the disc force exposed to fluid pressure, so as to obtain actuation of the disc valve at the predetermined fluid pressure differential. The second bypass valve functions in a similar manner with the dimensioning of the orifice being matched to the spring bias force.

It is important to note that the design of each bypass valve is application specific in the Silverwater filter. A new application would require a redesign and remanufacture of the entire filter assembly. The disc valve of the Silverwater filter is in the form of a disc bowed against the direction of flow and which opens fully at a predetermined pressure differential. The flow through required is provided by dimensioning the disc and valve seat so as to give an annular opening necessary to achieve the predetermined flow capacity when the valve opens. Disk thickness, amount of bow, disk diameter and annular opening diameter are determined by the pressure differential to be resisted, i.e., the resistance to be offered by the spring action of the disc, and the flow capacity needed at a given pressure differential.

The Silverwater filter has several other design disadvantages: The pressure-sensitive annular spring disc valve is relatively costly to manufacture, and requires tight control of its dimensional tolerances. A small variation in the height to thickness ratio changes considerably load-deflection characteristics of the pressure-sensitive annular spring disc valve. Leakage is generally a big problem with this type of design valve mechanism. Cracking pressure (i.e., the pressure required to open the valve) is generally not consistent from part to part due to manufacturing variability and spring rate characteristics. The spring disc valve is generally useful where high loads and small deflection are required and allowable leakage can be high. The design is hard to adjust for a particular valve application. The dual valve is not presented in a replaceable cartridge type design.

An array of filter applications require that the filter elements or cartridges not only be replaceable, but also that various dual filter combinations of filter elements, i.e. different micron removal ratings, be adjustable to meet various system requirements. This of course would also entail the use of bypass valves that can also be easily selected and replaced to meet the various combinations and requirements of the dual filter elements. This is required because the bypass valves are designed to be responsive to a predetermined increase of pressure as a result of back pressure created upon obstruction of the fluid path by a blocked or plugged filter whereby the by-pass valve is moved to an open position. The predetermined increase in pressure as a result of back pressure is in part a function of the porosity of the chosen filter element.

An economical, versatile, and reliable filter assembly is required to utilize replaceable and disposable cartridge type filters. Such a filter assembly requires an easily replaceable cartridge type dual stage filter element bypass valve. As will be described hereinafter, the subject invention includes a cartridge type dual bypass valve that not only provides for the efficient filtering of the fluid medium as required, but ensures continuous flow of the fluid through the dual stage bypass valve when the primary filter and secondary filter elements become obstructed.

DETAILED DESCRIPTION

The present invention is a replaceable cartridge type dual stage bypass valve for use in dual filter multi-media filtration assemblies. These assemblies are adaptable to a standard "spin-on, spin-off" design, and may be capable of separating particles at the micron and sub-micron level, yet provide the convenience of replaceable filter elements or cartridges. The filter elements or cartridges may be disposed in a cylindrical filter bowl as an outer filter element and a concentric inner filter element. The outer element may be the primary filter, and the inner element may be the secondary filter.

Embodiments of the present invention include a cartridge that may be selected and easily replaced to meet the various combinations and requirements of the dual filter elements (primary and secondary). The individual bypass valves that form the dual stage bypass valve may each be responsive to a predetermined increase of pressure due to a clogged filter condition. To accomplish this, the individual bypass valves may use replaceable coil springs that are economical, versatile, reliable, and may be easily manufactured. The spring force of the coil spring is determined by the pressure differential to be resisted, i.e., the resistance to be offered by the spring action of the spring, and the flow capacity at a given pressure differential.

Figure 1:
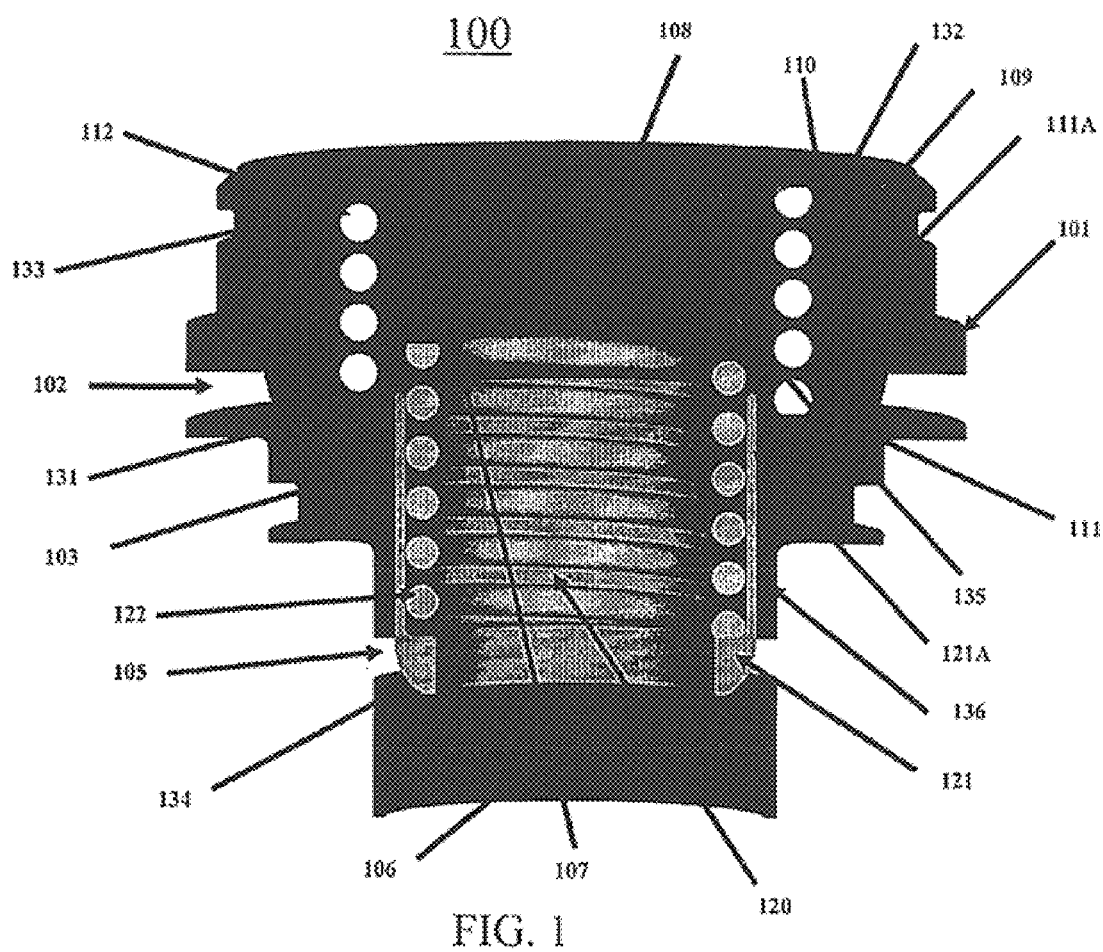
FIG. 1 illustrates a cross section view of a dual stage bypass valve according to an embodiment of the present invention.

FIG. 1 illustrates a cross section of a dual stage bypass valve according to an embodiment of the present invention. Dual stage bypass valve 100 includes a cylindrical housing 101 that may contain a first stage bypass valve 110 including a first valve plunger 111, and a first coiled spring 112, a second stage bypass valve 120 including a second valve plunger 121, and a second coiled spring 122. Cylindrical housing 101 may further include a first passage 102, a second passage 103, a third passage 105, an inlet chamber 106, a central chamber 107, and a outlet chamber 108.

Figure 2:
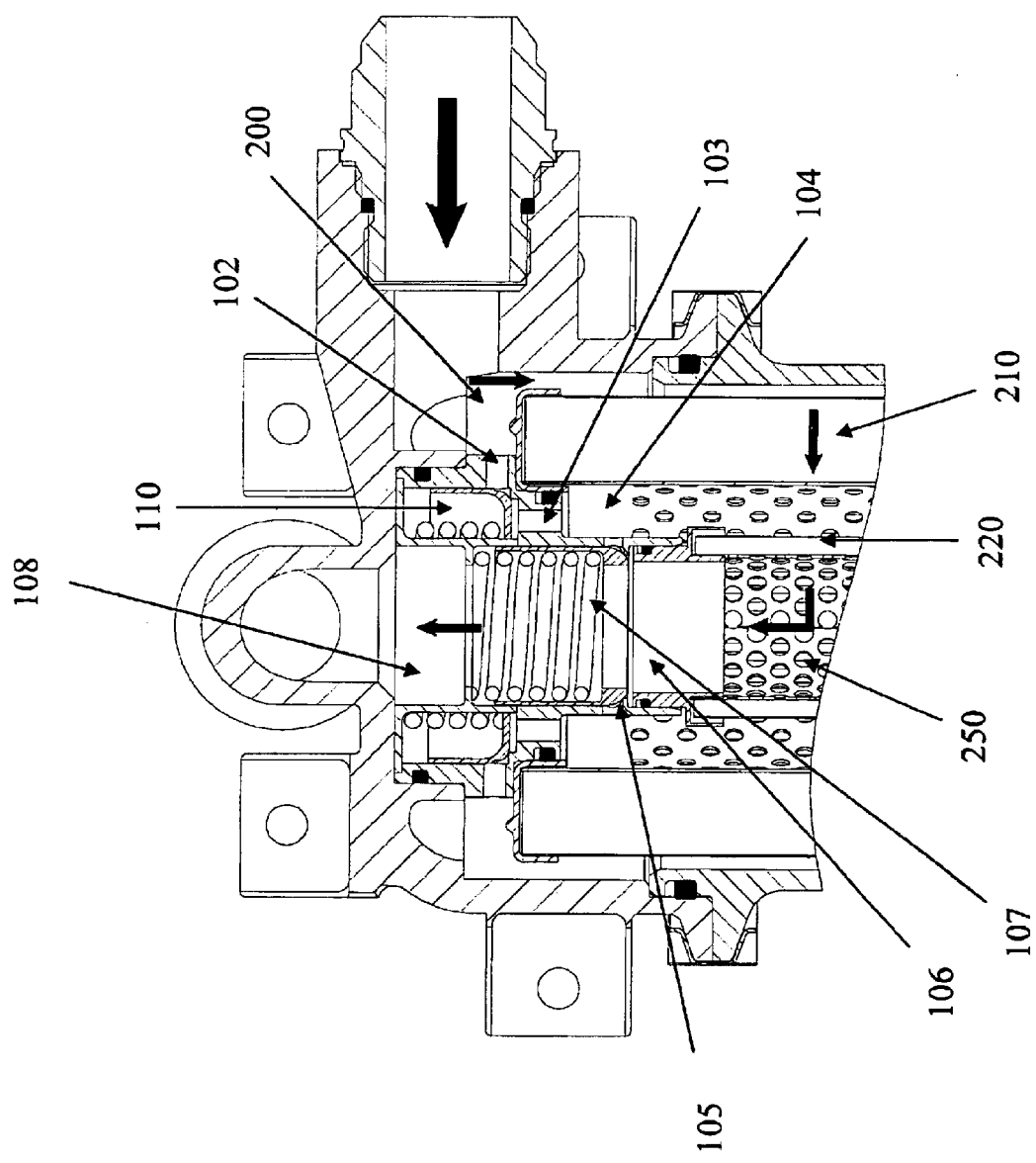
FIG. 2 illustrates an unrestricted flow with no bypass according to an embodiment of the present invention.

FIG. 2 illustrates an unrestricted flow with no bypass according to an embodiment of the present invention. The first stage bypass valve 110 of the dual stage bypass valve 100 is exposed to a pressure in an inlet port 200 and is responsive to a predetermined increase of pressure in the inlet port 200 as a result of back pressure created therein upon obstruction of the fluid path through a primary filter element 210. When the fluid pressure in the inlet port 200 is below the predetermined level, i.e. the primary filter is unobstructed, the first stage bypass valve 110 is in a closed position resulting in no bypass of fluid through the valve. Thus, the fluid medium to be filtered passes through the inlet port 200, through the primary filter element 210, through an intermediate chamber 104, and is directed into a secondary filter element 220 for the filtering thereof. The filtered fluid medium is discharged from the secondary filter element 220 into a central core 250, into the inlet chamber 106, through the central chamber 107 and into the outlet chamber 108 for the removal thereof through the outlet for recirculation to the source.

Figure 3:
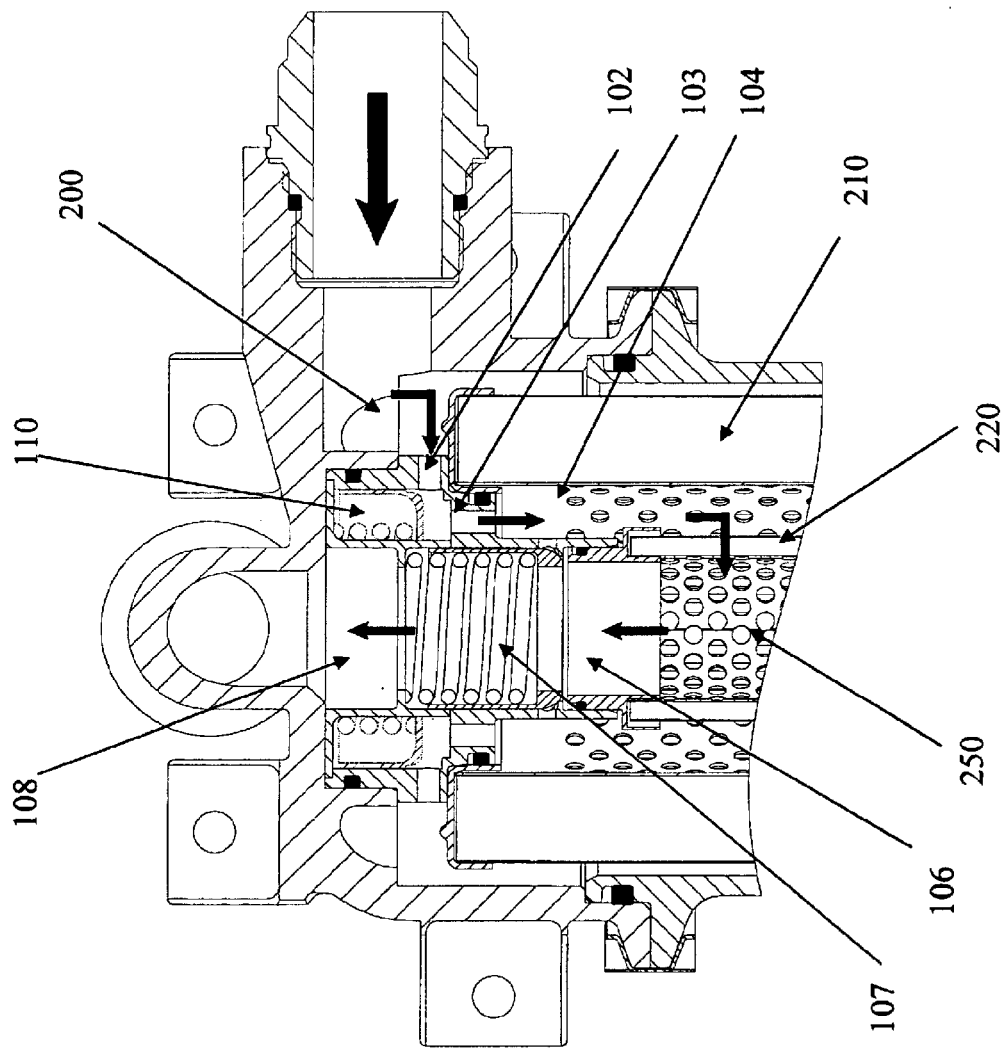
FIG. 3 illustrates a restricted flow with bypass through the first stage of the dual stage bypass valve according to an embodiment of the present invention.

FIG. 3 illustrates a restricted flow with a bypass through the first stage of the dual stage bypass valve 100 according to an embodiment of the present invention. The first stage bypass valve 110 is exposed to the pressure in the inlet port 200 and is responsive to back pressure created therein upon obstruction of the fluid path through the primary filter element 210 whereby the first stage bypass valve 110 is moved to an open position. Thus, the fluid medium to be filtered passes through the first passage 102, through the first stage bypass valve 110, through the second passage 103, through the intermediate chamber 104 and is directed into a secondary filter element 220 for the filtering thereof. The filtered fluid medium is discharged from the secondary filter element 220 into the central core 250, into the inlet chamber 106, through the central chamber 107, and into the outlet chamber 108 for the removal thereof through the outlet for recirculation to the source.

With reference to FIG. 1, FIG. 2, and FIG. 3 the operation of the first stage bypass valve 110 will now be described in further detail. As stated above, in one embodiment of the invention the dual stage bypass valve 100 includes a cylindrical housing 101 in the form of a tubular element that is received within a filter assembly. The tubular structure has a central passageway therethrough formed by the inlet chamber 106, the central chamber 107, and the outlet chamber 108. The first stage bypass valve 110 is formed in a cavity 109 in the cylindrical housing 101 disposed radially outside and concentric with the central chamber 107 and the outlet chamber 108.

The first stage bypass valve 110 includes a first valve plunger 111 and a first coil spring 112 that are also disposed radially outside and concentric with the central chamber 107 and the outlet chamber 108. The first coil spring 112 urges the first valve plunger 111 into sealing engagement with a first valve seat 131 formed as an internal flange within the cavity 109 in the cylindrical housing 101.

The first valve plunger 111 is positioned so that it is normally in contact with the first valve seat 131. The first coil spring 112 is positioned between first valve plunger 111 and a radially extending flange 132 formed as an internal flange within the cavity 109 in the cylindrical housing 101. The first valve plunger 111 has an axially extending member 111A that slidably engages an inner wall 133 formed as part of the cavity 109 in the cylindrical housing 101. Thus, the first coil spring 112 resiliently urges the first valve plunger 111 into sealing contact with the first valve seat 131 to normally prevent the flow of fluid through passageway 102. Therefore, the unfiltered fluid enters the inlet port 200 and passes into the primary filter element 210.

However, if the differential fluid pressure across the primary filter element 210 builds to a preselected pressure, the first valve plunger 111 is displaced against the force applied by the compression of first coil spring 112 whereby the first stage bypass valve 110 is moved to an open position. Thus, the fluid medium to be filtered bypasses the primary filter element 210 through the first passage 102, through the first stage bypass valve 110, through the second passage 103, through the intermediate chamber 104 and is directed into the secondary filter element 220 for the filtering thereof. The filtered fluid medium is discharged from the secondary filter element 220 into the central core 250, through the inlet chamber 106, through the central chamber 107 and into the outlet chamber 108 for the removal thereof through the outlet for recirculation to the source.

Figure 4:
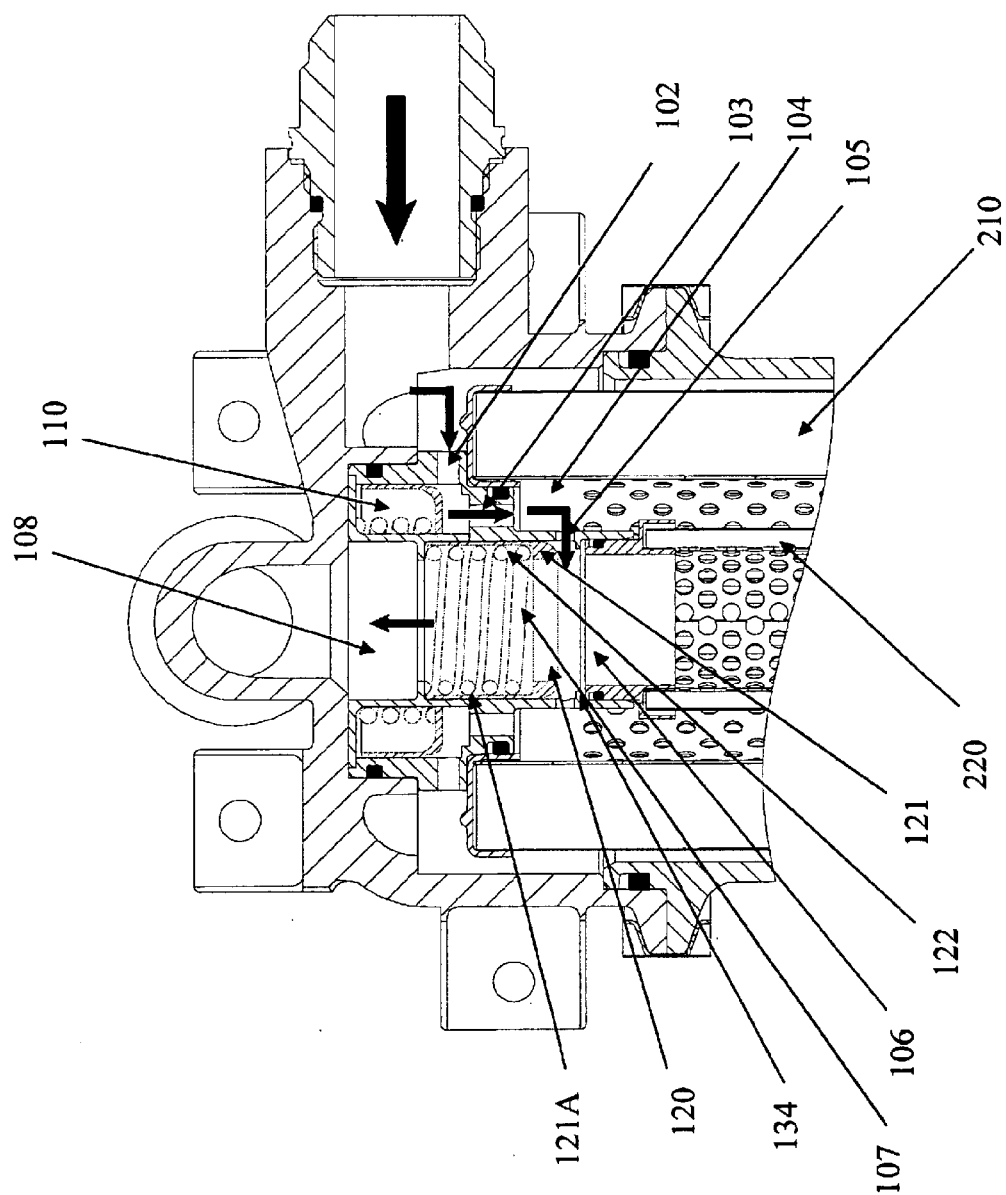
FIG. 4 illustrates a restricted flow with bypass through the first stage and second stage of the dual stage bypass valve according to an embodiment of the present invention.

FIG. 4 illustrates a restricted flow with bypass through the first stage and second stage of the dual stage bypass valve 100 according to an embodiment of the present invention. The second stage bypass valve 120 of the dual stage bypass valve 100 is exposed to the pressure in the intermediate chamber 104 between the primary filter element 210 and secondary filter element 220 and is responsive to a predetermined increase of pressure in the intermediate chamber 104 as a result of back pressure created therein upon obstruction of the fluid path through the secondary filter element 220 whereby the second stage bypass valve 120 is moved to an open position. Thus, the fluid medium passes through the first stage bypass valve 110 and into the intermediate chamber 104 between the primary filter element 210 and secondary filter element 220. The unfiltered fluid medium then passes through the third passage 105 through the second stage bypass valve 120 into the central chamber 107 and out through the outlet chamber 108 for the removal thereof through the outlet for recirculation to the source.

With reference to FIG. 1, FIG. 2, FIG. 3, and FIG. 4 the operation of the second stage bypass valve 120 will now be described in further detail. The second stage bypass valve 120 includes a second valve plunger 121 and a second coil spring 122 that are disposed within and concentric with the central chamber 107. The second coil spring 122 urges the second valve plunger 121 into sealing engagement with a second valve seat 134 formed as an internal flange within the central chamber 107.

The second valve plunger 121 is positioned so that it is normally in contact with the second valve seat 134. The second coil spring 122 is positioned between second valve plunger 121 and a radially extending flange 135 formed as an internal flange between the central chamber 107 and the outlet chamber 108 in the cylindrical housing 101. The second valve plunger 121 has an axially extending member 121A that slideably engages a wall 136 formed as part of the central chamber 107 in the cylindrical housing 101. Thus, the second coil spring 122 resiliently urges the second valve plunger 121 into sealing contact with the second valve seat 134 to normally prevent the flow of fluid through passageway 105.

If the differential fluid pressure across the secondary filter element 220 builds to a preselected pressure, the second valve plunger 121 is displaced against the force applied by the compression of second coil spring 122 whereby the second stage bypass valve 120 is moved to an open position. Thus, the fluid medium bypasses the primary filter element 210, through the first passage 102, through the first stage bypass valve 110, through the second passage 103, through the intermediate chamber 104, bypasses the secondary filter element 220 through the third passage 105, through the central chamber 107 and into the outlet chamber 108 for the removal thereof through the outlet for recirculation to the source.

While the description above refers to particular embodiments of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the foregoing description, and all changes that come within the meaning and range of equivalency of the claims are therefore intended to be embraced therein.

What is claimed is:

1. A dual stage bypass valve for controlling fluid flow through or around a primary filter and a secondary filter of a filter assembly, the dual stage bypass valve comprising:

a tubular housing having a central axis and including an outer cavity disposed radially outside and concentric with an inner central passage formed by a flange;

a first stage bypass valve having a first valve plunger and a first coiled spring, and a second stage bypass valve having a second valve plunger and a second coiled spring, wherein the first coiled spring is disposed radially outside and concentric with the flange in the outer cavity adjacent said first valve plunger and urges said first valve plunger into closed contact with a first seat member, a first radial passageway extends radially through a wall of the tubular housing and permits fluid flow to axially unseat the first valve plunger and permit fluid flow through the first stage bypass valve, the second coiled spring is positioned in the inner central passage adjacent said second valve plunger and urges said second valve plunger into closed contact with a second seat member, an axial passageway extends axially through said tubular housing and fluidly communicates with a second radial passageway permitting fluid flow to axially unseat the second valve plunger and permit fluid flow through the second stage bypass valve, wherein the fluid flow passes through the primary filter and the secondary filter in series when the first stage bypass valve and the second stage bypass valve are in a closed position, and wherein the dual stage bypass valve including the tubular housing are removably positioned within a housing of the filter assembly.

2. The dual stage bypass valve of claim 1, wherein the first stage bypass valve bypasses fluid around the primary filter, and the second stage bypass valve bypasses fluid around the secondary filter.

3. The dual stage bypass valve of claim 2, wherein the first stage bypass valve in an open position communicates with an inlet port and an intermediate chamber.

4. The dual stage bypass valve of claim 3, wherein the intermediate chamber is located between the primary filter and the secondary filter.

5. The dual stage bypass valve of claim 4, wherein the inner central passage includes an inlet chamber, a central chamber, and an outlet chamber.

6. The dual stage bypass valve of claim 5, wherein the second stage bypass valve in an open position communicates with the intermediate chamber, and the outlet chamber via the central chamber.

7. A dual stage bypass valve for controlling fluid flow through or around a primary filter and a secondary filter of a filter assembly, the dual stage bypass valve comprising:
a tubular housing having a central axis and including an outer cavity disposed radially outside and concentric with an inner central passage formed by a flange;
a first stage bypass valve having a first valve plunger and a first coiled spring for bypassing fluid around a primary filter, and a second stage bypass valve having a second valve plunger and a second coiled spring for bypassing fluid around a secondary filter, wherein the first coiled spring is disposed radially outside and concentric with the flange in the outer cavity adjacent said first valve plunger and urges said first valve plunger into closed contact with a first seat member, a first radial passageway extends radially through a wall of the tubular housing and permits fluid flow to axially unseat the first valve plunger and permit fluid flow through the first stage bypass valve, the second coiled spring is positioned in the central passage adjacent said second valve plunger and urges said second valve plunger into closed contact with a second seat member, an axial passageway extends axially through said tubular housing and fluidly communicates with a second radial passageway permitting fluid flow to axially unseat the second valve plunger and permit fluid flow through the second stage bypass valve, and wherein the dual stage bypass valve including the tubular housing are removably positioned within a housing of the filter assembly.

8. The dual stage bypass valve of claim 7, wherein the first stage bypass valve in an open position communicates with an inlet port via a first passage, and an intermediate chamber via a second passage.

9. The dual stage bypass valve of claim 8, wherein the intermediate chamber is located between the primary filter and the secondary filter.

10. The dual stage bypass valve of claim 9, wherein the inner central passage includes an inlet chamber, a central chamber, and an outlet chamber.

11. The dual stage bypass valve of claim 10, wherein the second stage bypass valve in an open position communicates with the intermediate chamber via a third passage, and the outlet chamber via the central chamber.

12. A filter assembly comprising:
a primary filter;
a secondary filter; and
a dual stage bypass valve including a tubular housing having a central axis, a first stage bypass valve, a second stage bypass valve, the tubular housing includes an outer cavity disposed radially outside and concentric with an inner central passage formed by a flange, the first stage bypass valve having a first valve plunger and a first coiled spring for bypassing fluid around the primary filter, the second stage bypass valve having a second valve plunger and a second coiled spring for bypassing fluid around the secondary filter, the first coiled spring being disposed radially outside and concentric with the flange in the outer cavity adjacent said first valve plunger and urging said first valve plunger into closed contact with a first seat member, a first radial passageway extending radially through a wall of the tubular housing and permitting fluid flow to axially unseat the first valve plunger and permit fluid flow through the first stage bypass valve, the second coiled spring being positioned in the central passage adjacent said second valve plunger and urging said second valve plunger into closed contact with a second seat member, an axial passageway extending axially through said tubular housing and fluidly communicating with a second radial passageway permitting fluid flow to axially unseat the second valve plunger and permit fluid flow through the second stage bypass valve, wherein the dual stage bypass valve including the tubular housing are removably positioned within a housing of the filter assembly.

13. The filter assembly of claim 12 wherein the first stage bypass valve in an open position communicates with an inlet port and an intermediate chamber.

14. The filter assembly of claim 13, wherein the intermediate chamber is located between the primary filter and the secondary filter.

15. The filter assembly of claim 12, wherein the central passage includes an inlet chamber, a central chamber, and an outlet chamber.

16. The filter assembly of claim 15, herein the second stage bypass valve in an open position communicates with the intermediate chamber, and the outlet chamber via the central chamber.

* * * * *